Jan. 26, 1965 KOICHI OHTSU 3,167,264

AUTOMATIC CONTROL FOR TAPE RECORDERS

Filed Aug. 24, 1961 2 Sheets-Sheet 1

KOICHI OHTSU,
INVENTOR.

BY Knight & Rodgers
ATTORNEYS

Jan. 26, 1965 KOICHI OHTSU 3,167,264

AUTOMATIC CONTROL FOR TAPE RECORDERS

Filed Aug. 24, 1961 2 Sheets-Sheet 2

KOICHI OHTSU,
INVENTOR.

BY Knight & Rodgers

ATTORNEYS

United States Patent Office 3,167,264

Patented Jan. 26, 1965

3,167,264

AUTOMATIC CONTROL FOR TAPE RECORDERS

Koichi Ohtsu, Tokyo, Japan, assignor, by mesne assignments, of one-half to Akai Electric Co., Ltd., Tokyo, Japan, a corporation of Japan, and one-half to Rheem Manufacturing Company, New York, N.Y., a corporation of California Filed Aug. 24, 1961, Ser. No. 133,744

10 Claims. (Cl. 242—55.12)

The present invention relates generally to the art of tape recorders; but is more particularly concerned with an automatic control mechanism that may be added as an accessory to a standard tape recorder for automatically recycling the tape recorder through the operations necessary to play and rewind the magnetic tape over a selected section between the ends of the tape. Although the invention is mentioned as being particularly applicable to tape recorders, it will be understood that it may be used equally well with apparatus recording on wire or any other elongated medium.

Previously known devices for playing a selected section of recording tape, rewinding the tape, and then automatically repeating the playing, have various short comings. One device utilizes an arrangement actuated by a change in the tension of the tape created by fastening the tape ends to the two reels. Thus at either end of the forward wind or rewind periods at the end of the tape a loop in the tape straightens out and the increase in tension actuates a switch which in turn effects reversal of the parts. This arrangement has the disadvantage that the starting and stopping points of the section of the tape to be repeated are limited to the ends of the tape. In other words a full reel must be played and it is not possible to select some intermediate portion of the tape to be played.

Another known arrangement is to fasten a short length of conducting metal foil to the magnetic tape at each end of the section to be played in order to complete a circuit between two contact points as the foil passes between them, the circuit when energized effecting the necessary changes in movement of the tape. A marked disadvantage of this arrangement is that the time that the foil requires to pass through the contact points is much shorter as the tape is rewound because of the higher linear speed of the tape and as a result it is very difficult to operate the necessary relays without fail. If the time lag in operation is sufficiently great, the foil passes between the contact points without energizing the circuit as required. While this arrangement permits previous selection of a portion of a tape to be played repeatedly, at the same time it is cumbersome and difficult to carry into operation and does not make possible an easy change in the selected section, either in length or location.

It is thus a general object of the present invention to provide a system for automatically recycling a tape recorder that can operate satisfactorily even when the tape speed becomes high, as during the rewinding period, and consequently is certain in operation under all conditions.

It is a further object of the invention to provide an automatic control system for a tape recorder of the character described which permits easy and quick selection of the points of starting and stopping the tape and also an easy change in the location of these points.

More particularly, it is an object of the present invention to provide an automatic control mechanism for recycling the operation of a tape recorder which is characterized by the following advantageous features: First, a low speed of the control member for the purpose of effecting certain and accurate control even during the periods when the tape speed is high; second, to provide direct reading indications of the position on the reel of the tape; third, to provide a knob or the like which can be set manually at points corresponding to the desired starting and stopping positions on the tape.

Apparatus embodying the present invention and achieving the above objects includes circuit means selectively energizing the forward drive and rewind drives of the tape recorder and reproducer, normally only the forward drive being energized; a first switch in the circuit means actuatable to alter the normal condition of the circuit means to de-energize the forward drive and energize the rewind drive; a second switch means in the circuit means actuatable to restore the normal condition of the circuit to de-energize the rewind drive and re-energize the forward drive; and adjustable switch actuating means adapted to actuate the first switch means at a first selected point in the tape travel and to actuate the second switch means at a second selected point in the tape travel spaced from the first point along the tape.

The switch actuating means preferably comprises a control member that is driven at a known fixed rate with respect to the tape so that its position always indicates the tape position, the control member carrying graduation for reading directly the tape position. The switch actuating means are carried by the control member and are independently adjusted thereon to establish the points in the tape travel at which the two switches are actuated. This control member is driven from the tape recorder forward drive through a speed reducing gear train and thus moves relatively slowly.

How the above and other objects of my invention are achieved will be more readily understood by reference to the following description, and the annexed drawing, in which.

Figure 1:
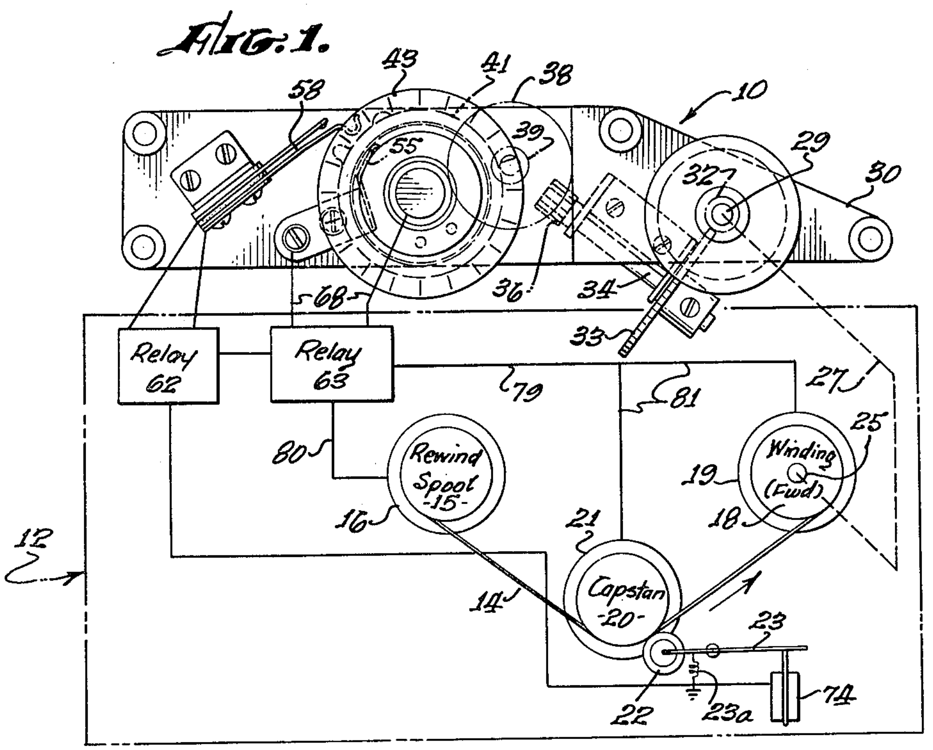
FIG. 1 is a plan view of an automatic control apparatus embodying the present invention with the operating relays and the principal parts of the associated tape recorder and reproducer shown diagrammatically.
Figure 2:
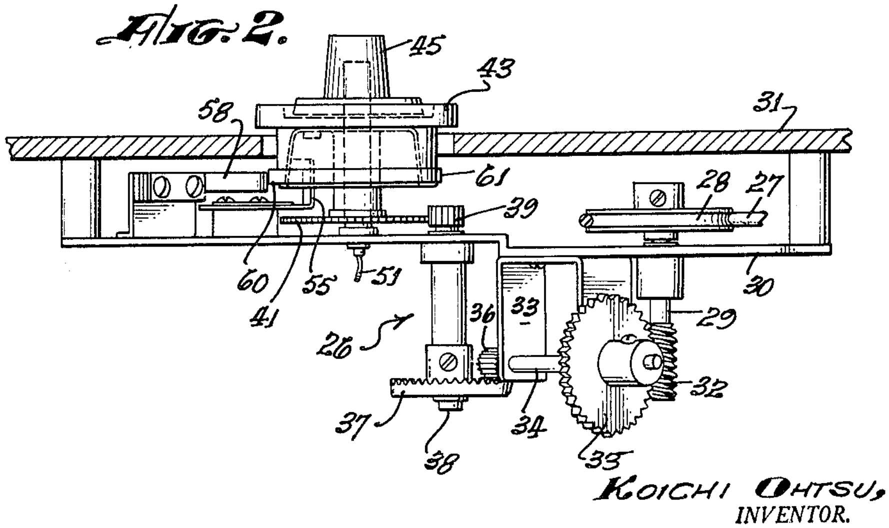
FIG. 2 is a side elevation of a control apparatus alone.

Referring now to the drawing, there is shown in FIGS. 1 and 2 a control mechanism embodying the present invention which is designed to recycle a tape recorder and reproducer in such a manner that a selected portion of the magnetic recording tape can be automatically replayed time after time. Control mechanism indicated generally at 10 is used in conjunction with the tape recorder which is shown diagrammatically at 12. A diagrammatic showing of this recorder and its essential parts is considered sufficient to an understanding of the invention since the tape recorder may be of any suitable construction. The term "tape recorder" alone is used commonly in the broad sense to refer to apparatus which not only records but reproduces sounds recorded on a magnetic tape, and such meaning is intended herein since both functions are normally incorporated in a single piece of apparatus. The reproducing and rewinding functions are combined here with an automatic recycling arrangement that is manually adjustable to play back any selected section of tape.

Magnetic tape 14 is initially wound on a supply and rewind reel 15 which is driven by motor 16 in a direction to rewind the tape onto reel 15. In the normal forward movement of the tape (indicated by the arrow in FIG. 1), the tape is unwound from reel 15 and wound onto forward winding reel 18 which is driven in the forward direction by forward drive motor 19. The tape passes over capstan 20 which is drivingly connected to forward drive motor 21 which drives capstan 20 in the counter-clockwise direction to advance the tape at a constant speed. The magnetic tape is held against the periphery of capstan 20 by means of pressure roller 22 mounted on the end of arm 23, the pressure roller being biased away from engagement with the tape and the capstan by means of spring 23*a* or other suitable means.

The driving connection between motor 19 and a reel 18 may be limited to shaft 25 when a torque motor 19 is used, since the reel is driven at varying speeds according to the diameter of the tape wound on it but at such a speed as to take up the tape after it passes the capstan.

Drive shaft 25 serves as a power source to drive the control mechanism through a speed reducing gear train indicated generally at 26 in FIG. 2 and which will now be described. The connection between shaft 25 and the gear train may be a direct one, but is typically a belt drive from shaft 25 as indicated by belt 27 passing around pulley 28. Pulley 28 is mounted on shaft 29 which is rotatably mounted in a base on mounting plate 30. Mounting plate 30 is normally attached to the underside of front panel 31 of the tape recorder, as indicated in FIG. 2, but it will be realized that the gear train can be mounted in any suitable manner.

Shaft 29 has mounted on it worm gear 32 which drivingly engages spiral gear 33 fastened to shaft 34. Shaft 34 is rotatably mounted in U-shaped bracket 35 suitably mounted on mounting plate 30. Also attached to shaft 34 is pinion 36 which drivingly engages crown gear 37 fastened on shaft 38. Shaft 38 is journaled in a suitable bearing arrangement mounted on the mounting plate and also carries pinion 39 which meshes with and drives a large gear 41. Gear 41 is attached to the control member, as will be described. The purpose of this speed reducing gear train 26 between input 27 and output 29 is to effect a high order of speed reduction between the winding shaft 25 and the control member. It is a positive drive that causes dial 43 to travel over a known path in response to travel of the tape, whereby graduations on the face of dial 43 (FIG. 3) can indicate known points on the tape for the position of the dial.

Gear 41 is affixed to the sleeve-like hub 42 of dial 43 which constitutes the control member for determining the beginning, end and length of the play back period, as will be explained later. Hub 42 rotatably mounts control dial 43 on fixed shaft 44 which is attached to mounting plate 30 in any suitable manner. As gear 41 turns, it rotates dial 43 about the axis of shaft 44 in such a way that the angular movement of the dial is proportional to the linear travel of tape 14 and consequently the dial occupies an angular position which is known with respect to any given linear position of the tape 14. To assist in directly reading the tape position, dial 43 is graduated on its face, the calibrations being in suitable terms of the length of tape travel.

Also rotatably mounted on shaft 44 is a manually adjustable knob 45 which may be angularly adjusted with respect to the fixed shaft 44. Knob 45 carries on its underside an electrical contact 48 which is electrically connected through spring wiper 49 with a conducting portion of shaft 44 that is electrically connected to conductor 51 extending through the shaft and beyond mounting plate 30. Switch contact 48 rotates with knob 45 and as a result of relative rotation with respect to dial 43 is engageable with switch contact 53 carried by dial 43. Contact 43 is in electrical connection with slip ring 54 which is a cup shaped member on the under side of dial 43. Slip ring 54 is in sliding contact with spring finger 55 inside dial 43 and is a portion of the electrical control circuit which will be described.

Contacts 48 and 53 constitute a first switch means in a control circuit means to be described. A second switch means in the control circuit means is indicated at 58 in FIGS. 1 and 2. The switch 58 is a normally open switch which is mounted by an insulating block on mounting panel 30 and the contacts of the switch are adapted to be closed by projection 60 which is carried upon a split ring 61 mounted on the lower portion of dial 43 so that projection 60 rotates with the dial. Split ring 61 frictionally engages dial 43 so that the projection 60 can be adjusted manually to a selected angular position with respect to dial 43, after which the projection moves with the dial and when it engages the switch 58 causes the contacts of that switch to close.

Figures 3, 4:
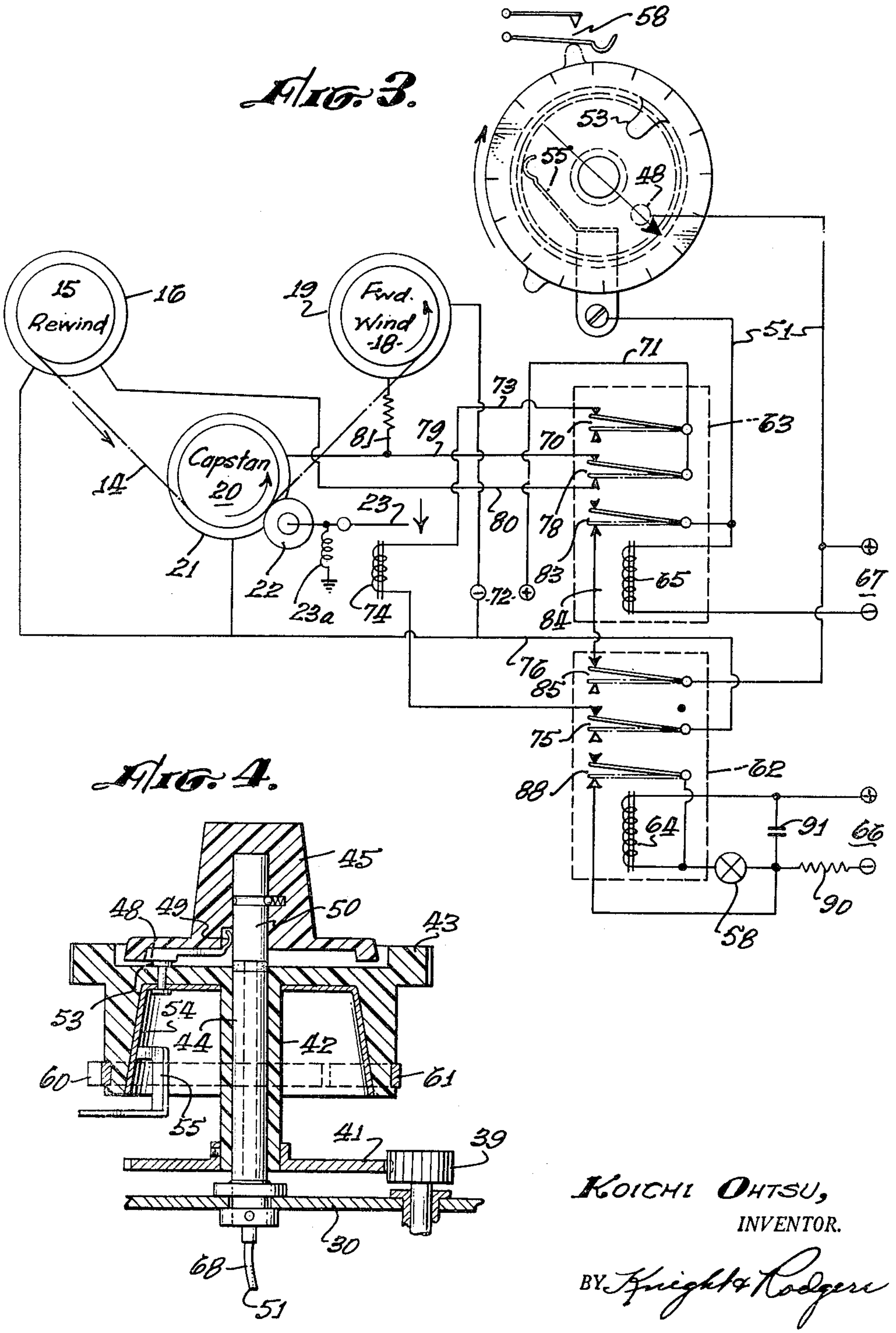
FIG. 3 is a wiring diagram of the control circuit.
FIG. 4 is an enlarged longitudinal median section through the control member and the adjustment knob associated therewith.

The control circuit which is connected electrically to the tape recorder and which controls the recycling operation of the tape recorder in response to the settings of the control dial 43, is shown generally in FIG. 1 and in greater detail in FIG. 3. The control circuit includes relay 62 and relay 63 and the connections of these relays to the drives 16, 19 and 21 for rewind reel 15, forward wind 18 and capstan 20 respectively as well as the connections of the relays to the switch 48, 53 and switch 58.

The relays 62 and 63 are each multiple switch relays. In this case each has three switches ganged to move from the normal position to the alternate position when solenoids 64 and 65 respectively are energized. The two solenoids are the operating coils of the relays and are connected respectively to power sources 66 and 67 which may be same or different sources of suitable D.C. power. Coil 65 is connected in series with switch 48, 53 to power source 67 by conductors 51.

Referring now particularly to FIG. 3 it will be seen that relay 63 includes normally closed switch 70 having its movable contact connected through conductor 71 to one terminal of power source 72, the fixed contact of switch 70 being connected through conductor 73 to solenoid 74 which, when energized, exerts a pull on arm 23 in a direction to urge pressure roller 22 against the periphery of capstan 20. The circuit through switch 70 and solenoid 74 is completed through normally closed switch 75 of relay 62, the movable contact of which is connected by conductor 76 to the other terminal of D.C. power source 72. Thus when both relays are de-energized or in the normal condition illustrated, power flows through solenoid 74 to urge the pressuer roller against the capstan to advance tape 14.

Switch 78 of relay 63 is a double throw switch which in the normal position indicated in solid lines completes a circuit through one fixed contact connected with conductor 79 to capstan drive 21 and in the alternate position shown in dotted lines completes a circuit through the other fixed contact and conductor 80 to rewind drive 16 for the rewind reel 15. Conductor 79 is connected to branch conductor 81 connected to drive 19 for the winding reel 18, this drive also being normally energized as a part of the forward drive.

The third switch 83 of relay 63 is a normally open switch which, when holding coil 65 is energized, moves to the alternate position indicated by the dotted line in which the movable contact completes a circuit through the fixed contact and conductor 84 to switch 85 of relay 62. Switch 85 is normally closed. As a consequence when holding coil 65 is energized and switch 83 is in the closed position, a holding circuit through conductor 84 and switch 85 is normally completed to one of the terminals of power source 67 which energizes holding coil 65. When the switch 85 is moved to the alternate open position as a result of energization of holding coil 64, switch 85 is open and the circuit is broken at this point.

A third switch 88 of relay 62 is normally open and moves to the closed position when holding coil 64 is energized thus completing an auxiliary circuit through the contacts of the switch and conductor 89 in parallel with switch 58 that can energize coil 64 even when switch 58 is open. Switch 58 is in series with coil 64 and resistance 90. Capacitor 91 is in parallel across the terminals of coil 64.

Having described the construction of the invention, its operation will now be described. When the control circuit is in its normal condition holding coils 64 and 65 are de-energized and all the switches of the two relays occupy the positions shown in FIG. 3 in full lines. Under these circumstances, winding motor 19 and capstan motor 21 are energized causing tape 14 to advance in the direction indicated by the arrows in FIG. 3, moving from rewind reel 15 to forward winding reel 18. Rewind drive 16 is de-energized. In order to cause the control member to actuate the control circuit to start the recycling operation at a selected point in the top travel, which is the end of a selected length of tape 14, knob 45 is rotated manually to a corresponding position indicated by the graduations on the face of dial 43. Dial 43 continues to rotate in proportion to the travel of tape 14 and when the moving contact 53 engages stationary contact 48, the circuit to coil 65 through conductors 68 is closed by the first switch means, which energizes coil 65. Energizing coil 65 causes switches 70, 78 and 83 to be moved to the alternate positions shown by the dotted lines in FIG. 3. When switch 70 is opened, solenoid 74 is de-magnetized, releasing pressure roll 22. The pressure roll is now moved away from the circumference of capstan 20 by the spring 23*a*, allowing tape 14 to move freely independently of the capstan. The double throw switch 78 is moved to a position in which the forward drives for forward reel 18 and capstan 20 are de-energized and in which the rewind drive 16 is energized, causing tape 14 to travel in reverse direction and be wound up on reel 15. Tape 14 continues to be rewound on reel 15 as long as the rewind drive 16 remains energized.

Normally open switch 83 closes when holding coil 65 is energized, completing a holding circuit through switch 83, conductor 84 and switch 85 to the two terminals of power source 67, which maintains coil 65 energized after the switch contacts 53 and 48 separate due to reverse rotation of dial 43. It will be realized that, as tape 14 moves in reverse direction, dial 43 likewise moves in a reverse direction and that contacts 53 and 48 are disengaged very shortly after engagement.

Rewind motor 16 turns at a relatively high speed in order to reduce the length of time that it takes to rewind a given length of tape on spool 15; and dial 43 accordingly moves faster in a reverse direction than in a forward direction but at the same time it moves at a greatly reduced speed determined by the overall gear ratio of the speed reduction gear train 26. As long as coil 65 is energized, switch 78 remains in the alternate position energizing the rewind drive 16.

Eventually dial 43 reaches an angular position, determined by the relative position of projection 60 on the dial, at which projection 60 engages switch 58 to close the contacts of that switch and complete a circuit that energizes holding coil 64 of relay 62. Closing switch 58 causes capacitor 91 to discharge through coil 64 energizing the operating coil of relay 62. This moves the movable contacts of switches 85, 75 and 88 to the alternate dotted line position shown in FIG. 3. As a result, relay 63 is de-energized when switch 85 opens and switches 70, 78 and 80 are restored to normal positions; solenoid 74 remains de-energized when switch 75 opens; and switch 88 is closed to establish a holding circuit in parallel with switch 58 which maintains holding coil 64 energized for a sufficient length of time to insure that capacitor 91 is fully discharged, even though switch 58 opens before discharge of the capacitor is complete. When the discharge of the capacitor is complete, coil 64 is de-energized because of resistor 90 in series with the coil and power source 66 and switches 85, 75 and 88 return to their normal positions.

With the control circuit in its normal position, rewind motor 16 stops and the forward drive provided by motors 19 and 21 starts again to advance tape 14. Shortly after relay 63 returns to a normal condition, the discharge of capacitor 91 is completed and coil 64 is de-energized, returning relay 62 to a normal condition and causing the circuit to be completed that energizes solenoid 74. This solenoid urges pressure roll 22 against the capstan; but it will be noted that this action of the pressure roll has been delayed until shortly after the forward drive has been re-energized. The relative delay in energizing solenoid 74 is caused by the delay circuit including capacitor 91.

Both relays now having returned to their normal condition and the tape being again moved forwardly in the direction of the arrows of FIG. 3, the tape is again advanced at low speed for reproducing sound recorded thereon. This condition continues until the rotation of dial 43 brings contact 53 into engagement with contact 48, which engagement determines the end of the playing. This point can be adjusted to any desired position in the path of travel of dial 43 by manual adjustment of knob 45. Likewise the beginning point of the play back period, which is also the end of the rewind period, can be adjusted manually to any desired position in the path of dial 43 by rotating projection 60 around the base of dial 43.

The complete cycle of playing and rewind is repeated automatically time after time in the manner described above as long as power is supplied to the control circuit.

From the foregoing it will be seen that various changes may be made in the control mechanism and the associated circuit, without departing from the spirit and scope of the invention; and it is intended that all such modifications be included in the scope of the invention as defined by the appended claims.

I claim:

1. In a tape recorder and reproducer having a pair of tape holding reels, the combination comprising:
   - a low speed forward drive means for driving one of said reels in a direction to advance the tape and to wind it on said one reel;
   - a high speed reverse drive means for driving the other of said reels in a direction to rewind the tape on said other reel;
   - a capstan and drive means therefor to advance the tape at a constant low speed;
   - circuit means connected to all of said drives and normally energizing the capstan and the forward drives;
   - a movable control member driven over a predetermined path by the forward drive means in a fixed relation to tape travel and always occupying a known position within its range of travel for a given tape position;
   - a first switch means in the circuit means actuated by first means carried on the control member when at a first predetermined position, the first switch means when actuated de-energizing the capstan and the forward drives and energizing the rewind drive;
   - and a second switch means in the circuit means actuated by second means carried by the control member when at a second predetermined position in the travel of the control member spaced from the first predetermined position, said second switch means when actuated restoring the circuit means to said condition normally energizing the forward capstan drives;
   - each of said switch actuating means carried by the control member being individually and manually adjustable relative to the control member to locate the point of actuation of the respective switch means in the range of travel of the control member.

2. In a tape recorder and reproducer having a pair of tape holding reels, the combination as in claim 1 that also comprises:
   - a pressure roller cooperating with the capstan to press the tape thereagainst;
   - means biasing the pressure roller away from the capstan;
   - and means in the circuit means and normally energized thereby to urge the pressure roller against the tape and capstan in opposition to said biasing means.

3. In a tape recorder and reproducer having a pair of tape holding reels, the combination as in claim 2 in which the circuit means includes time delay elements energizing the means urging the pressure roller against the tape after the capstan drive means is energized.

4. In a tape recorder and reproducer having a pair of tape holding reels, the combination comprising:

a low speed forward drive means for driving one of said reels in a direction to advance the tape and to wind it on said one reel;

a high speed reverse drive means for driving the other of said reels in a direction to rewind the tape on said other reel;

a capstan and drive means therefor to advance the tape at a constant low speed;

circuit means connected to all of said drives and in normal condition energizing the capstan and the forward drives;

a rotatable control member driven by the forward drive means in a fixed relation to tape travel and always occupying a known rotational position for a given tape position;

a first switch means in the circuit means and including a first switch contact carried by the rotatable control member and a second switch contact movably mounted concentric with the control member and manually adjustable to a predetermined position in the path of the first contact for engagement therewith, the switch means when the contacts thereof are engaged de-energizing the capstan and the forward drives and energizing the rewind drive;

a second switch means of the normally open type in circuit means closed by movement of the rotatable control member when at a second predetermined position in its travel spaced from said first predetermined position, said second switch means when closed restoring the circuit means to said normal condition energizing the forward and capstan drives;

and manually adjustable means on the rotatable control member movable relative thereto to shift said second predetermined position within the normal range of travel of the rotatable control member.

5. Control mechanism for automatically recycling a tape recorder and reproducer or the like having a forward drive and a rewind drive for magnetic recording tape, comprising in combination:

a rotatably mounted control member independent of and spaced from the tape;

means operatively connected to the forward drive for moving the control member over a given rotational path in a predetermined relation to movement of the forward drive, the control member occupying a known rotational position for any predetermined position of the tape;

circuit means selectively energizing the forward drive and the rewind drive and in a normal condition energizing the forward drive;

a first switch means in said circuit means actuated by movement of the control member at a selected rotational position in the travel of the control member to alter the state of said circuit means to de-energize the forward drive and energize the rewind drive, said first switch means including a first contact carried by the rotatable control member and movable therewith and a second contact engageable by the first contact and supported independently of the control member and adjustable manually over an arcuate path to change the position of the second contact relative to the first contact;

a second switch means in said circuit means;

and means on the control member actuating said second switch means at a second selected position in the range of rotational travel of the control member to restore the circuit to said normal condition.

6. Control mechanism as in claim 5 in which the means on the control member for actuating the second switch means is rotatably adjustable relative to the control member to adjust the position of the actuating means.

7. Control mechanism as in claim 5 in which the means moving the control member is operatively connected to the forward drive to move the control member positively in synchronism with the tape travel.

8. Control mechanism for automatically recycling a tape recorder and reproducer or the like having a pair of tape holding reels between which tape is transported, a forward drive for one reel, a rewind drive for the other reel and a capstan drive therefor advancing the tape toward said one reel, comprising in combination:

a rotatably mounted control member spaced from the tape;

means operatively connected to the forward drive for moving the control member over a given rotational path in a predetermined relation to movement of the forward drive, the control member occupying a known rotational position for any predetermined position of the tape;

circuit means selectively energizing the forward drive and the rewind drive and in a normal condition energizing the forward drive;

a first switch means in said circuit means actuated by movement of the control member at a selected rotational position in the travel of the control member to alter the state of said circuit means to de-energize the forward drive and the capstan drive and energize the rewind drive, said first switch means including a first contact carried by the rotatable control member and movable therewith and a second contact engageable by the first contact and supported independently of the control member and adjustable manually over an arcuate path to change the position of the second contact relative to the first contact;

a second switch means in said circuit means;

and means on the control member actuating said second switch means at a second selected position in the range of rotational travel of the control member to restore the circuit to said normal condition.

9. Control mechanism as in claim 8 which also includes a pressure roller adapted to press the tape against the capstan to advance the tape; and solenoid means urging the roller against the tape and capstan; and the circuit means includes means energizing the solenoid only during energization of the capstan drive.

10. Control mechanism as in claim 9 in which the circuit means includes a delaying circuit energizing the solenoid shortly after energization of the capstan drive.

References Cited in the file of this patent

UNITED STATES PATENTS

| | | |
|---|---|---|
| 2,514,578 | Heller et al. | July 11, 1950 |
| 2,567,644 | Leach et al. | Sept. 11, 1951 |
| 2,661,163 | Greene | Dec. 1, 1953 |
| 2,815,907 | McCormick | Dec. 10, 1957 |
| 2,891,736 | Blaes | June 23, 1959 |
| 2,943,804 | Loewe et al. | July 5, 1960 |